(12) United States Patent
Poddar

(10) Patent No.: US 7,075,548 B1
(45) Date of Patent: Jul. 11, 2006

(54) EFFICIENT DETECTION OF TEXTURE SHARING BETWEEN MULTIPLE CONTEXTS

(75) Inventor: Bimal Poddar, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 09/672,954

(22) Filed: Sep. 29, 2000

(51) Int. Cl.
*G09G 5/00* (2006.01)
*G06T 11/40* (2006.01)

(52) U.S. Cl. ............................... 345/582; 345/552
(58) Field of Classification Search ......... 345/582–587, 345/552, 430, 588, 505, 522, 501, 506, 556
See application file for complete search history.

(56) References Cited

U.S. PATENT DOCUMENTS

| | | | | |
|---|---|---|---|---|
| 5,230,039 A | * | 7/1993 | Grossman et al. | 345/582 |
| 5,550,962 A | * | 8/1996 | Nakamura et al. | 709/232 |
| 5,594,854 A | * | 1/1997 | Baldwin et al. | 345/441 |
| 5,818,469 A | * | 10/1998 | Lawless et al. | 345/522 |
| 6,243,736 B1 | * | 6/2001 | Diepstraten et al. | 718/108 |

OTHER PUBLICATIONS

Lazzarotto, Patrick. "Bitwise Logical Operations in CA–Visual Objects." Cavo.com, newslettler, Dec. 1999. ☐☐http://www.cavo.com/newsletter/vo199912/bitwise.pdf.*

"OpenGL Overview," 2 pp., obtained from the WebSite: www.opengl.org.
"OpenGL Architecture," 2 pp., obtained from the WebSite: www.opengl.org.
"OpenGL Graphics Functions & Capabilities," 3 pp., obtained from the WebSite: www.opengl.org.

* cited by examiner

*Primary Examiner*—Jeffery A. Brier
*Assistant Examiner*—Eric Woods
(74) *Attorney, Agent, or Firm*—Schwegman, Lundberg, Woessner & Kluth, P.A.

(57) ABSTRACT

A technique for detecting texture sharing between multiple contexts having unique ID's includes obtaining a texture usage mask of a subject texture and a context ID of a subject context. A first logic operation with the texture usage mask of the subject texture and the context ID of the subject context is performed to produce a resultant value. The subject texture is determined not to be shared by another context with the subject context upon the resultant value being equal to a first predetermined value. The subject texture is determined to be shared by another context with the subject context upon the resultant value being equal to a second predetermined value which is different from the first predetermined value. The texture usage mask of a subject texture may be revised prior to the subject texture being used by another context by performing a second logic operation with the texture usage mask and a context ID of another context to produce a resultant new texture usage mask for the subject texture. The texture usage mask of a subject texture may be revised upon the subject texture no longer being used by a particular context by performing a third logic operation with the texture usage mask and a context ID of the particular context to produce a resultant new texture usage mask for the subject texture.

18 Claims, 4 Drawing Sheets

EFFICIENT DETECTION OF TEXTURE SHARING BETWEEN MULTIPLE CONTEXTS

FIELD

The present invention relates to texture sharing in an openGL API (Application Programming Interface) or other graphics programming interface. More particularly, the present invention relates to a technique for effecting an efficient detection of texture sharing between multiple contexts.

BACKGROUND

Graphics programming interfaces, such as the openGL API, are being rapidly developed to keep up with their great demand for use in graphics displays in computer applications. U.S. Pat. No. 5,818,469, to John Joseph Lawless et al. discloses an example of a graphics programming interface.

FIG. 1, which illustrates a schematic representation of a graphics architecture shows a graphics application 101 which is typically running on a workstation or other computer system. A graphics interface 103 receives data from the graphics application 101 and processes the data prior to forwarding it to hardware 115 using a plurality of threads. A thread is a predefined program segment and is operable to effect the accomplishment of a specified individual graphics task such as rasterizing or rendering. A plurality of threads 107 and 109 to be used for rendering are fed from the graphic interface 103 to the hardware 115. Each thread maintains its own local graphics context containing the attribute state. Threads 107 and 109 may include related graphics contexts 108 and 110, respectively associated therewith.

FIG. 2, which illustrates a simplified block diagram of a computer system, shows an exemplary system 200 in which the graphics subsystem 217 corresponds to the hardware 115 of FIG. 1. A central processing unit (CPU) 201 is connected to a central bus 203. A memory subsystem 205 and cache memory 207 are also connected to the bus 203 as is a storage block 215 which may include one or more storage devices such as floppy disk drives, hard drives, etc. A display device 219 is connected to the graphics subsystem 217. An input interface device 209 connects a keyboard 211 and a mouse 213 to the bus 203. The bus 203 may be extended 221 to be connected to other systems and/or devices.

The graphics subsystem 217 typically includes an internal graphics processor as well as a frame buffer memory for use in connection with the display device. For example, the graphics subsystem 217 generally includes rasterization hardware as well as other specific graphics engines. Instructions for performing graphics interfacing processes may be executed by the processor 201 and/or a separate graphics processor disposed within the graphics subsystem 217. To such instructions may be embodied within or stored in any one of or a combination of storage devices and/or memory devices including RAM memory within the memory subsystem 205, any of the storage elements of the storage block 215 or any portable storage device, such as a floppy disk or CD.

The openGL API provides for textures to be shared by multiple rendering contexts. In addition, each context may have multiple texture units that use the same texture. For certain operations with a texture, it is important to distinguish between multiple contexts using a texture or a single context using a texture in multiple units.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention is limited only by the terms of the appended claims.

The following represents brief descriptions of the drawings, wherein.

DETAILED DESCRIPTION

Figure 1:
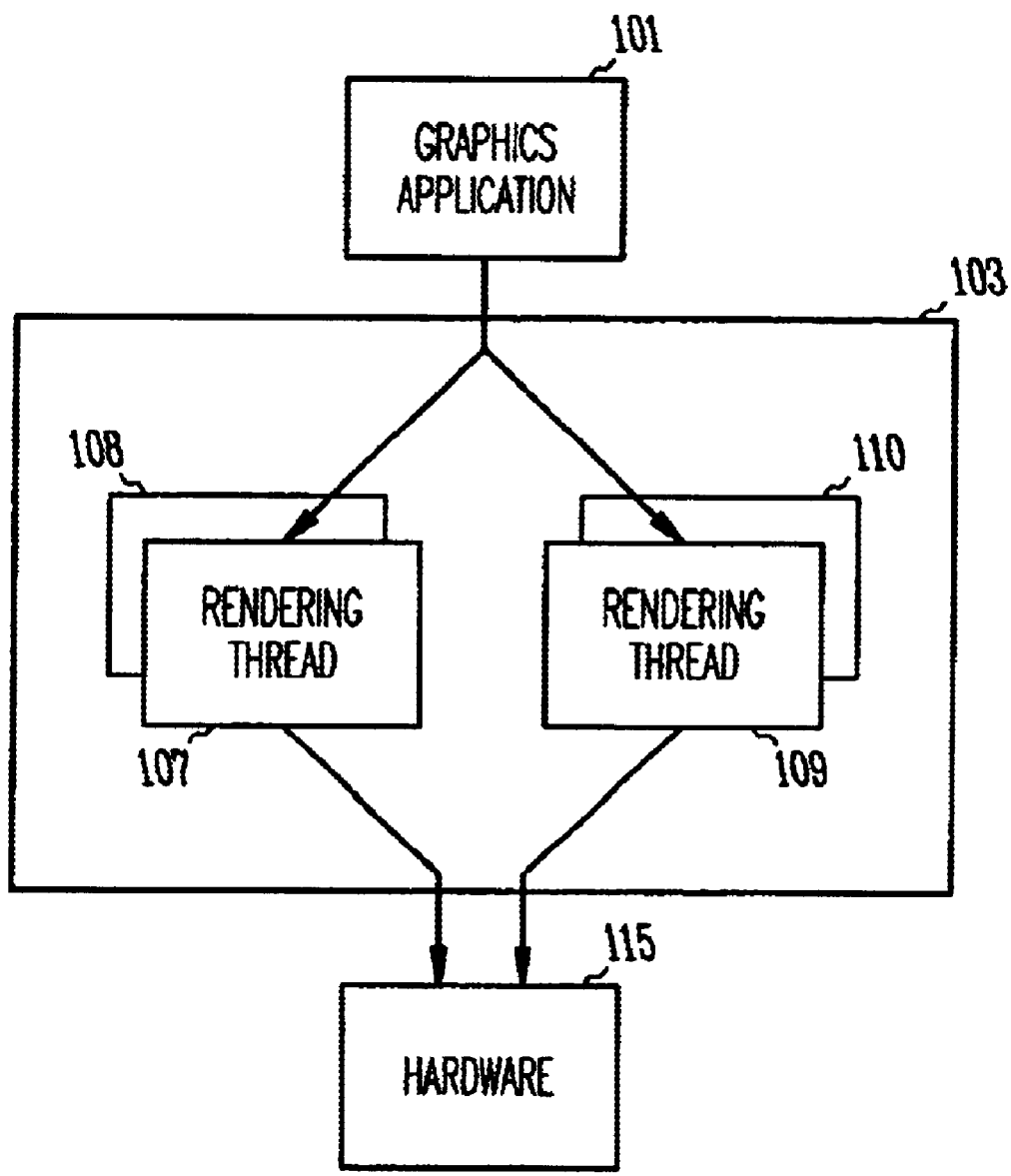
FIG. 1 illustrates a schematic representation of a graphics architecture arrangement.
Figure 2:
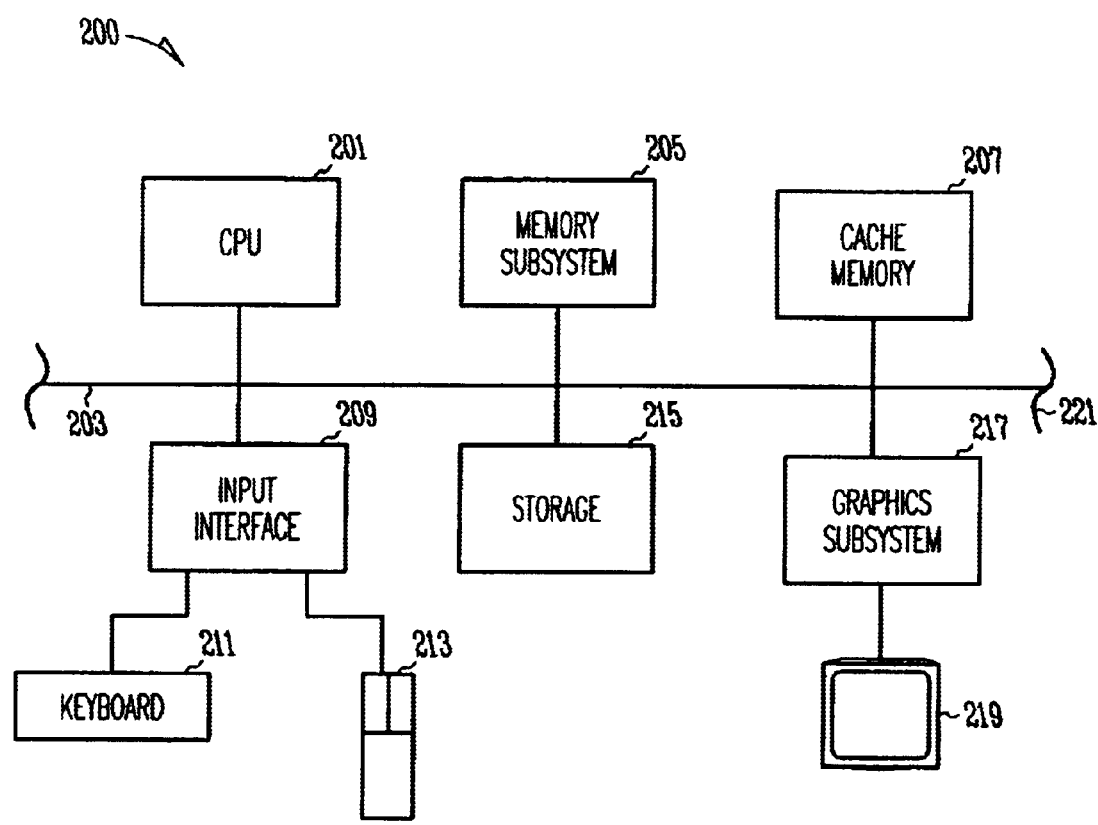
FIG. 2 illustrates a simplified block diagram of a computer system.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. In addition, various connections and other elements may not be shown within the drawing figures for simplicity of illustration and discussion and so as not to obscure the invention.

The openGL API, as with other graphics APIs, provides for a rendering context. The rendering context encapsulates all of the states necessary to render triangles with attributes such as color, fog, etc. The context information also includes texture images that may consume large amounts of memory. OpenGL allows an application to have multiple contexts so that the separate context can be bound to multiple threads to allow simultaneous rendering by multiple threads. However, one context can be bound to only one thread. Since the texture images are fairly large, openGL allows for sharing of textures by multiple contexts. When things are shared between multiple threads, it is a common practice to include mutual exclusion locks to prevent a second thread from using the same texture object while the first thread is using the texture object. However, in order to avoid a stall of any thread for a substantial time period, the mutual exclusion lock may be used only for a short time period to set a read lock flag in the texture and then release the mutual exclusion lock. The read lock flag could be implemented by simply updating a reference counter of the texture. This allows both the threads to simultaneously render using the same texture.

Due to recent advances in graphics hardware, openGL, for example, allows for each context to have multiple texture units. The result of a blending of a polygon color and a lookup from one texture unit are passed onto the next texture unit. A single texture may be assigned to multiple units in a multi-texture pipeline.

An application may request the driver to change the texture image or any of its attributes. In order to safely change the texture image on one thread, it is important to know whether the texture is being used by only this thread/context or is being used by multiple threads/contexts. If each openGL context supported only one texture unit and if a texture had a reference count of more than 1, then there would be an implication that the texture is being used by multiple contexts and could not be safely modified. However, due to the presence of multiple texture units, a reference count does not provide all the information. For example, a reference count of 2 may indicate one of two alternatives, namely, either a texture is being used by a single texture unit on multiple contexts or is being used by multiple texture units on a single context. If the texture was being used by a single context on multiple texture units, then the texture could be safely modified but if the texture was used by multiple contexts then the texture could not safely be modified.

In order to determine whether a texture is being used by only a single context, it is possible to compare the texture with all of the texture units on a context and determine a usage count for a context. If the usage count matched the reference count for the texture, it would imply that the texture was being used only on this context. The determination of the usage count requires one compare operation and potentially one addition operation per texture unit. With the rapid improvements in graphics hardware, there is a reasonable expectation that the number of texture units may increase to 32 texture units. Thus, this method of determining the usage of a texture becomes rather expensive when applications require fast state changes for optimal performance.

In the present invention, when contexts request the sharing of a set of textures, each context is provided with its own unique identifier (ID). This unique identifier is a single bit in an integer word. When a context starts using a texture, it bitwise ORs its unique context ID into a texture usage mask. Each texture has its own texture usage mask. This texture usage mask tracks the identifiers of all of the contexts using the corresponding texture. If only one bit is turned on in the texture usage mask, then only one context is using the texture. Accordingly, to determine whether a texture is being used by another context, only the following simple test need be performed.

If the texture usage mask ANDed with the inverted context ID is equal to 0, then the texture is not being used by another context. If the texture usage mask ANDed with the inverted context ID is not equal to 0, then the texture is being used by another context.

Figure 3:
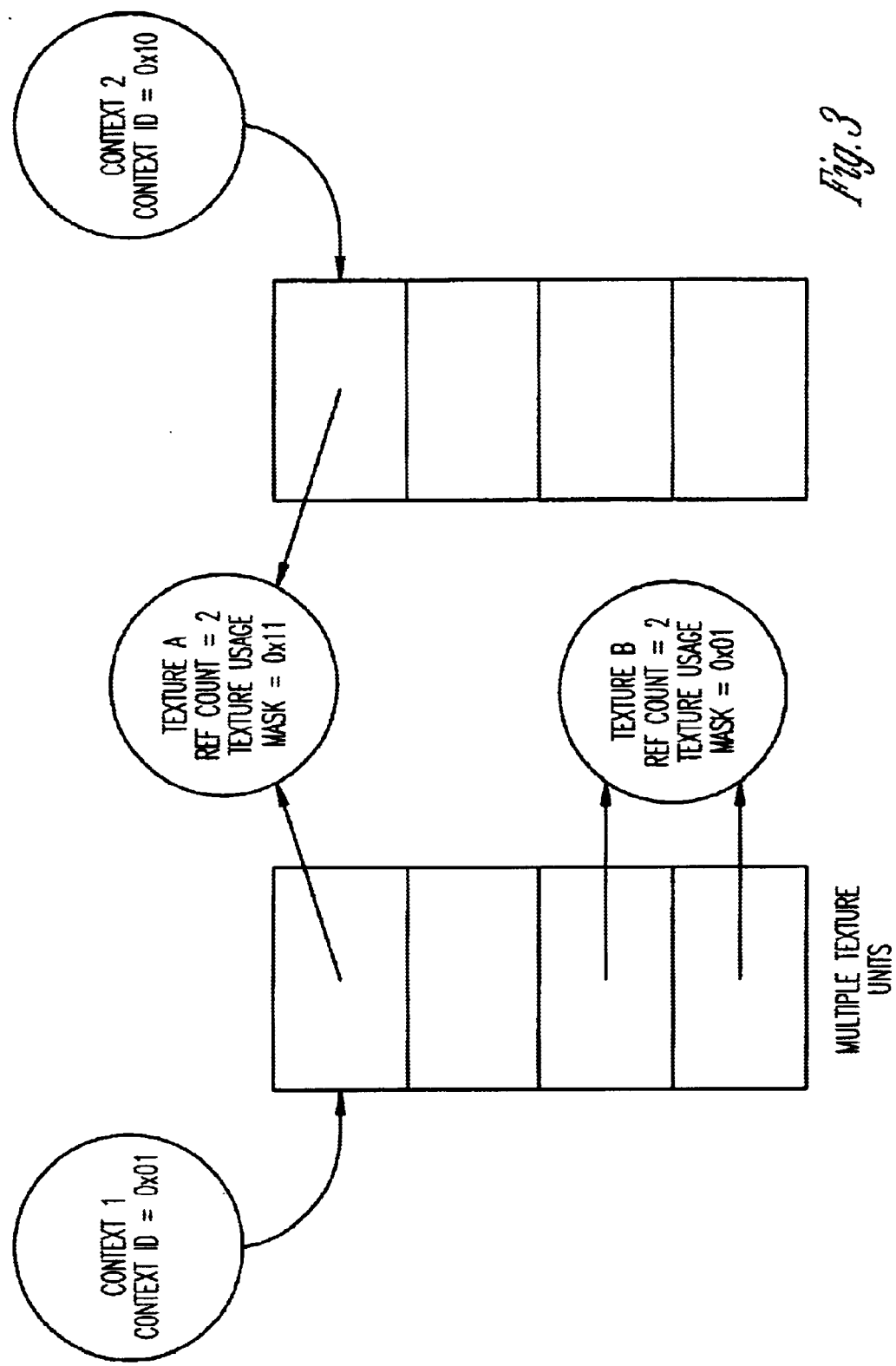
FIG. 3 illustrates an example used for explaining the technique in accordance with the present invention.

FIG. 3 illustrates an example used for explaining the technique in accordance with the present invention. As illustrated in FIG. 3, there are two contexts, Context 1 and Context 2, each context having 4 texture units. Texture A is being used by both Context 1 and Context 2 while Texture B is being used in multiple units only on Context 1. As can be seen from FIG. 3, Texture A has a reference count of 2. Furthermore, the texture usage mask for the texture, which is obtained by bitwise ORing of the two context IDs, indicates that both contexts are using the texture. On the other hand, Texture B, which also has a reference count of 2, only has the context ID bit for Context 1 set in its texture usage mask, thereby indicating that only a single context is using the texture. Thus, while the share status of a texture cannot be determined by the reference count of a texture, the texture usage mask for a texture clearly indicates whether the texture is being used by a single context or by multiple contexts. With the present invention, the determination of texture usage for multiple contexts can be effected using only one invert operation and one compare operation. In fact, the invert operation may be eliminated by maintaining a precomputed inverted context ID for each context.

Figure 4:
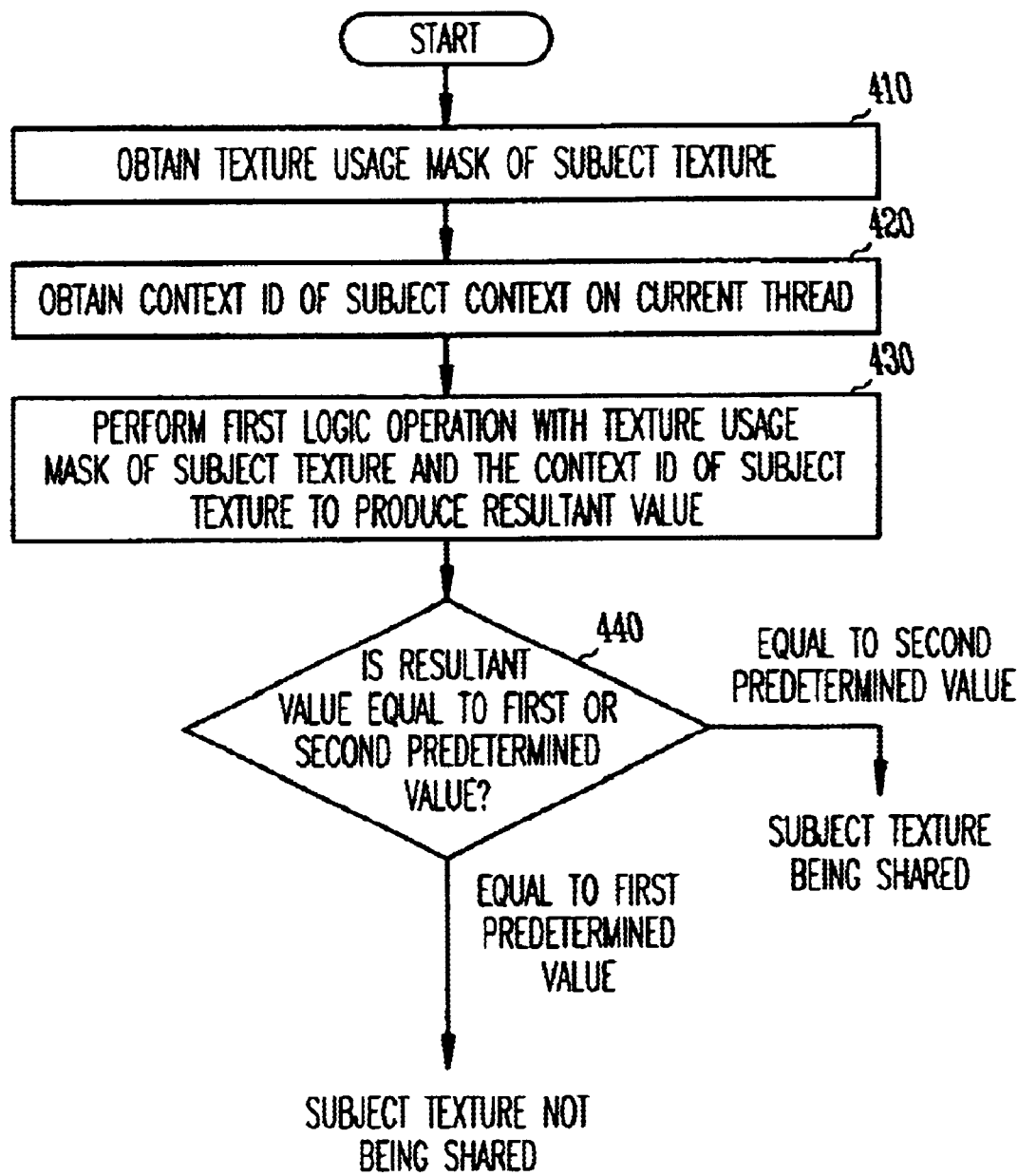
FIG. 4 illustrates a flowchart used for explaining the technique in accordance with the present invention.

FIG. 4 illustrates a flowchart used for explaining the technique in accordance with a present invention. Upon starting the technique for detecting the sharing of a texture between multiple contexts, in block 410, the texture usage mask of a subject texture is obtained.

In block 420, the context ID of a subject context is obtained and in block 430, a first logic operation is performed to produce a resultant value. As noted above, for example, the first logic operation might be the ANDing of the texture usage mask of the subject texture with an inverted context ID of the subject context to produce the resultant value.

In block 440, a determination is made as to whether the resultant value is equal to a first or second predetermined value. If the resultant value is equal to the first predetermined value, then the subject texture is not being shared while if the resultant value is equal to the second predetermined value, then the subject texture is being shared. As noted above, for example, the first predetermined value may be equal to 0 while the second predetermined value may be equal to any value other than 0.

When a context stops using a texture, it's context ID bit in the corresponding texture usage mask must be reset. This is performed as follows:

1. For the texture which is no longer going to be used, clear the context ID bit in its texture usage mask.

2. Attach a new texture to the texture unit.

3. Loop over all of the texture units in a context.

For each texture, set the context ID bit for this context in its corresponding texture usage mask.

The above-noted operation performs as many bitwise OR operations as the number of texture units. Note that multiple compare operations associated with the reference count scheme have been eliminated. In deeply pipelined hardware CPU implementations, compare operations may be computationally very expensive. In addition, the operation is performed only when a unit stops using a texture. The normal mode for a texture unit is to attach a texture, perform multiple operations on the texture, and then stop using the texture. Thus, with the present invention, operations that are proportional to the number of texture units are performed only once when a texture is detached from a texture unit.

In addition to modifying a texture, an openGL engine, for example, is supposed to virtualize textures. That is, if a system does not have enough hardware texture memory, then the driver is supposed to swap out some textures to the system memory and page in other textures from the system memory to the hardware texture memory. The texture manager, when executing one thread, must insure that it does not page out a texture that is actively being used by another texture unit. This can easily be determined by using the unique context IDs and the texture usage masks of the present invention rather than using a reference count which does not provide a complete answer.

Compared to existing techniques, the present invention reduces the number of operations from being on the order of the number of texture units to just one operation most of the time. Even when the number of operations is proportional to the number of texture units, the technique in accordance with the present invention is faster due to the elimination of costly compare operations.

This concludes the description of the example embodiments. Although the present invention has been described with reference to illustrative embodiments, it is to be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the variations and modifications in the component parts and/or arrangements, alternative uses will be apparent to those skilled in the art.

What is claimed is:

1. A method comprising:
obtaining a texture usage mask of a subject texture;
obtaining an inverted context ID of a subject context;
ANDing the texture usage mask of the subject texture with the inverted contex ID of the subject context to produce a resultant value;
detecting that the subject texture is not being shared by another context with the subject context upon the resultant value being equal to 0 and detecting that the subject texture is being shared by another context with the subject context upon the resultant value not being equal to 0 ; and
revising the texture usage mask of a subject texture prior to the subject texture being used by another context by bitwise ORing the texture usage mask with a context ID of the another context to produce a resultant new texture usage mask for the subject texture.

2. The method of claim 1, further comprising:
revising the texture usage mask of a subject texture upon the subject texture no longer being used by a particular context by deleting a context ID of the particular context from the texture usage mask to produce a resultant new texture usage mask for the subject texture.

3. The method of claim 1, further comprising:
revising the texture usage mask of a subject texture upon the subject texture no longer being used by a particular context by deleting a context ID of the particular context from the texture usage mask to produce a resultant new texture mask for the subject texture.

4. A method comprising:
obtaining a texture usage mask of a subject texture;
obtaining a context ID of a subject context;
performing a first logic operation with the texture usage mask of the subject texture and the context ID of the subject context to produce a resultant value;
detecting that the subject texture is not being shared by another context with the subject context upon the resultant value being equal to a first predetermined value and detecting that the subject texture is being shared by another context upon the resultant value being equal to a second predetermined value which is different from the first predetermined value, and
revising the texture usage mask of a subject texture prior to the subject texture being used by another context by performing a second logic operation with the texture usage mask and a context ID of the another context to produce a resultant new texture usage mask for the subject texture.

5. The method of claim 4, further comprising:
revising the texture usage mask of a subject texture upon the subject texture no longer being used by a particular context by performing a third logic operation with the texture usage mask and a context ID of the particular context to produce a resultant new texture usage mask for the subject texture.

6. The method of claim 5, further comprising:
revising the texture usage mask of a subject texture upon the subject texture no longer being used by a particular context by performing a third logic operation with the texture usage mask and a context ID of the particular context to produce a resultant new texture usage mask for the subject texture.

7. A program storage device readable by a machine, tangibly embodying a program of instructions executable by the machine to perform a method comprising:
obtaining a texture usage mask of a subject texture;
obtaining an inverted context ID of a subject context;
ANDing the texture usage mask of the subject texture with the inverted context ID of the subject context to produce a resultant value;
detecting that the subject texture is not being shared by another context with the subject context upon the resultant value being equal to 0 and detecting that the subject texture is being shared by another context with the subject context upon the resultant value not being equal to 0; and
revising the texture usage mask of a subject texture prior to the subject texture being used by another context by bitwise ORing the texture usage mask with a context ID of the another context to produce a resultant new texture usage mask for the subject texture.

8. The program storage device of claim 7, the method further comprising:
revising the texture usage mask of a subject texture upon the subject texture no longer being used by a particular context by deleting a context ID of the particular context from the texture usage mask to produce a resultant new texture usage mask for the subject texture.

9. The program storage device of claim 8, the method further comprising:
revising the texture usage mask of a subject texture upon the subject texture no longer being used by a particular context by deleting a context ID of the particular context from the texture mask to produce a resultant new texture usage mask for the subject texture.

10. A program storage device readable by a machine, tangibly embodying a program of instructions executable by the machine to perform a method comprising:
obtaining a texture usage mask of a subject texture;
obtaining a context ID of a subject context;
performing a first logic operation with the texture usage mask of the subject texture and the context ID of the subject context to produce a resultant value;
detecting that the subject texture is not being shared by another context with the subject context upon the resultant value being equal to a first predetermined value and detecting that the subject texture is being shared by another context upon the resultant value being equal to a second predetermined value which is different from the first predetermined value; and
revising the texture usage mask of a subject texture prior to the subject texture being used by another context by performing a second logic operation with the texture usage mask and a context ID of the another context to produce a resultant new texture usage mask for the subject texture.

11. The program storage device of claim 10, the method further comprising:
revising the texture usage mask of a subject texture upon the subject texture no longer being used by a particular context by performing a third logic operation with the texture usage mask and a context ID of the particular context to produce a resultant new texture usage mask for the subject texture.

12. The program storage device of claim 11, the method further comprising: revising the texture usage mask of a subject texture upon the subject texture no longer being used by a particular context by performing a third logic operation with the texture usage mask and a context ID of the particular context to produce a resultant new texture usage mask for the subject texture.

13. A computer-implemented method comprising:
retrieving a texture usage mask of a texture;
retrieving an inverted context ID of a context;
performing a first type of logical operation of the texture usage mask of the texture with the inverted context ID of the context;
detecting whether the texture is being shared by another context with the context based on the first type of logical operation;
performing a clear operation, an attach operation and a set operation when one of a number of texture units associated with a context completes the processing of a texture, wherein the clear operation includes clearing the identification of the context in the texture usage mask associated with the texture, the attach operation to include attaching a different texture to the one of the number of texture units that completed the processing of the texture and wherein the set operation includes setting the identification of the context in the texture usage mask for the textures being processed by the number of texture units in the context; and
and paging out a texture from a texture memory based on a type of logical operation of the identification of the contexts processing the texture and the texture usage mask of the texture, wherein the type of logical operation is the same as the first type of logical operation.

14. A system comprising:
a number of texture units to process a number of subject textures, wherein a texture unit of the number of texture units is associated with one of a number of contexts;
a texture memory to store at least one of the number of subject textures;
a system memory to store at least one of the number of subject textures;
a processor to execute instructions that include the following operations when one of the number of texture units for a context completes the processing of a texture,
clear the identification of the context in the texture usage mask associated with the subject texture;
attach a different subject texture to the one of the number of texture units that completed the processing of the texture;
set the identification of the context in the texture usage mask for the subject textures being processed by the number of texture units in the context; and
a texture manager to page out a texture from the texture memory to the system memory based on a logical operation of an identification of the contexts to process the texture and the texture usage mask of the texture.

15. The computer system of claim 14, wherein the logical operation is an AND operation.

16. The computer-implemented method of claim 13, wherein the first type of logical operation is an "AND" operation.

17. The computer-implemented method of claim 13, wherein the inverted context ID is a single bit in an integer word.

18. The computer-implemented method of claim 14, wherein the identification of a context is represented in a single bit in an integer word.

* * * * *